April 7, 1931.  F. S. FLOETER  1,799,893
TOOL HOLDER FOR DOUBLE ACTING LATHES
Original Filed Nov. 8, 1926
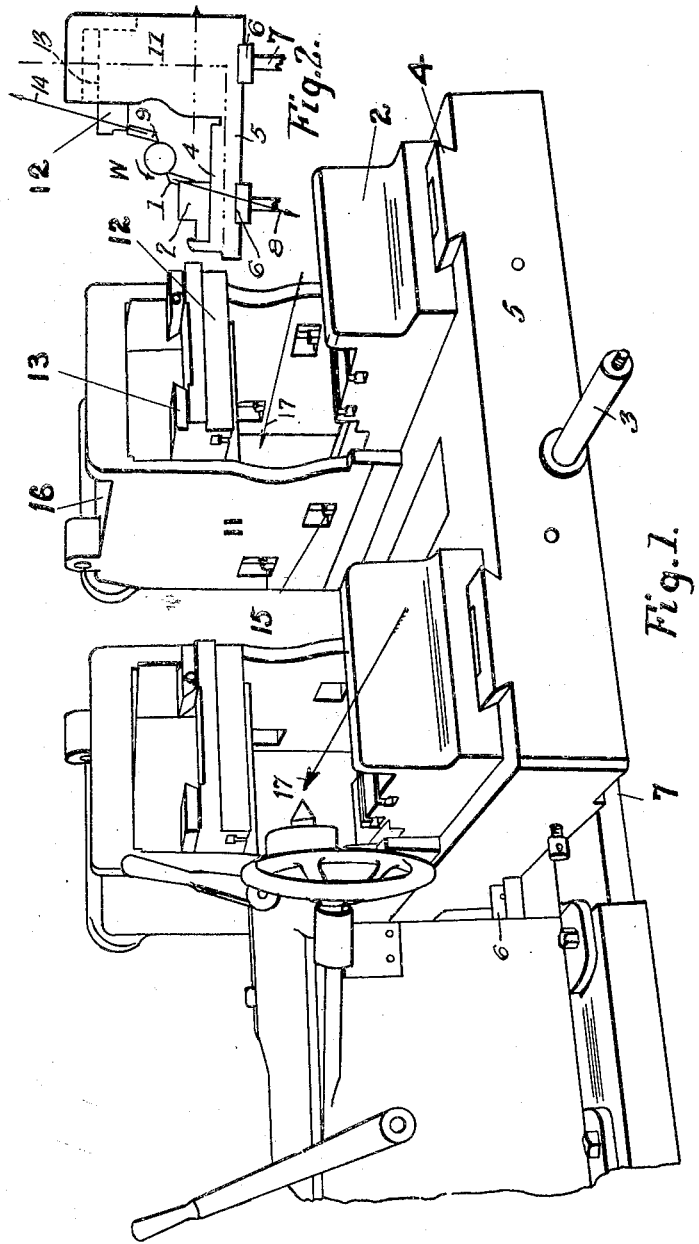
INVENTOR
Frederick S. Floeter
BY George B. Willcox
ATTORNEY Patented Apr. 7, 1931

1,799,893

UNITED STATES PATENT OFFICE

FREDERICK S. FLOETER, OF SAGINAW, MICHIGAN, ASSIGNOR TO WICKES BROS., OF SAGINAW, MICHIGAN, A CORPORATION OF MICHIGAN

TOOL HOLDER FOR DOUBLE-ACTING LATHES

Original application filed November 8, 1926, Serial No. 147,036. Divided and this application filed October 15, 1929. Serial No. 399,870.

The present application is divided out of my co-pending application Serial Number 147,036, filed Nov. 8, 1926.

This invention relates to turning lathes and pertains more particularly to that class of turning lathes adapted to shape an article, such as a crank shaft pin and the cheeks of the cranks by simultaneously applying two cutting tools, one to one side and the other to the other side of the revolving work, there being a cutting tool located in front of the work, that is, on the operator's side of the machine, and another tool located on the opposite side of the work, the two tools being thrown into work simultaneously. For the purpose of this description I will refer to such a lathe as a "double acting" lathe.

The object of my present invention is to enable the lathe to work at unusually high rates of cutting speed, taking cuts of unusual depth, but producing work with a high degree of accuracy and finish. I attain these objects by means of a novel mounting for the rear tool, whereby all tendency toward chattering is eliminated, even when taking very heavy cuts. Chattering is avoided by mounting in an inverted position the slide that carries the rear tool and seating it against the bottom face of a frame of novel and extremely rigid construction.

The frame has the physical characteristics of a punch-press body, in that the lower jaw of a punch press carries one of the die members and the upper jaw carries the other die member, the function of the back frame being to resist the tendency of the two jaws to spring apart when the die is under load.

In my invention I apply this same punch-press principle to a double acting turning lathe by mounting the front and back cutting tools on supporting slides, the front slide positioned normally, that is to say, located and operated as an ordinary lathe on a cross-slide carried by the girder-frame bed, the rear slide inverted and mounted against a horizontal bearing face on the under side of the rigid upright member of the frame, as will be described and claimed herein.

In this manner the frame members have their bearing faces respectively adapted to resist the downward and the upward working pressure of the slides and the frame as a whole rigidly withstands the tendency to spread and acts in the manner of a punch-press body.

Another feature of my invention is in the construction of the upright frame member, which is so formed that the revolving work serves as an impeller to drive the chips clear of the machine by sending them through an opening in the upper member of the frame. The cutting zone of the machine is thus automatically kept free from chips.

With the foregoing and certain other objects in view, which will appear later in the specification, my invention comprises the devices described and claimed and the equivalents thereof.

In the drawings Fig. 1 is a front view in perspective, the cutting tools being removed.

Fig. 2 is a diagrammatic view of the parts shown in Fig. 1.

W designates the work, which may be a crank shaft for an engine or any other suitable article to be turned, and 1 is the cutting tool usually carried by the front cross slide 2 which is adjusted by the cross feed screw 3. The cross slide 2 is mounted on the horizontal bearing face 4 of main slide 5 carried by ways 6 on the lathe bed 7, as usual in turning lathe construction.

It need only be pointed out here that the downward thrust of the front cutting tool 1, as indicated by the arrow at 8 in Fig. 2, produces downward pressure of the cross slide 2 upon the horizontal bearing face 4. Obviously there is no tendency to chatter, because the slide 2 is always in close contact with the bearing face 4, whether the tool is under load or not. A cutting load merely tightens the contact between the faces of 2 and 4.

My invention comprises a novel construction for a rigid non-chattering mounting for the back cutting tool 9. This novel construction comprises a rigid frame consisting of the horizontal member 5 and an upright member 11, on which latter the tool is mounted in the following manner:

Tool 9 is fixed to a tool-carrying slide 12, similar to slide 2 but inverted. The upper flat horizontal face of this slide extends across the space between the side walls of the upright member 11, which are spaced wide apart, as shown, for that purpose. The flat horizontal face of slide 12 takes against a bearing face 13 on the under side of upright member 11, so the upward thrust of cutting tool 9, indicated by the arrow 14 in Fig. 2, produces upward pressure of slide 12 against the wide, flat, horizontal bearing face 13.

It is now plain that the bearing face 4 which carries the front cutting tool, and the inverted wide flat horizontal bearing face 13 which takes the upward thrust of the back cutting tool 9 are in effect the working or thrust-resisting faces of a rigid jaw-like frame 5, 11.

By the means above described I have produced in a tool holder for double cutting lathes a frame that acts to prevent chattering as effectively as the rigid body of a punch-press. A claimed feature of the invention resides in a horizontal frame-member and the upright member rigidly connected, or integral as may be desired, the horizontal member having its usual horizontal bearing 4 that supports a normally positioned tool-carrying slide 2, the bearing face adapted to resist downward pressure caused by the thrust of the tool, in combination with the upright member of the frame provided with a horizontal bearing face 13 on its under side and spanning the space between the separated side walls of the upright frame, the face 13 being adapted to resist the upward pressure of the slide 12, upon which the back tool is mounted.

The upright frame-member 11 is in the form of a hollow box, the wide horizontal, flat-faced tool-carrying slides 12 extending across it from side to side and supported by its top 16.

In the form of housing shown in Fig. 1 a chip-discharging passageway 17 is provided between the sides of the upright member 11.

By this means I not only attain the advantages of rigidity and strength above described, but I also produce a heavy duty lathe that is self-cleaning in that it can not become clogged with loose chips.

Having thus described my invention, what I claim and desire to secure by Letters Patent is:—

1. In a tool holder for double acting lathes, a frame consisting of a horizontal member and an upright member rigidly connected, said horizontal member having a horizontal bearing face adapted to support a normally positioned tool-carrying slide, said face adapted to resist downward pressure of said slide, the upright member of said frame having side walls spaced apart and connected by a top member, a wide, flat horizontal bearing face on its under side between said side walls for supporting an inverted tool-carrying slide, said face adapted to resist upward pressure of said second slide, for the purposes set forth.

2. In a tool holder for double acting lathes, a frame consisting of a horizontal member and an upright box-like member having a top connecting member rigidly connected, said horizontal member having a horizontal bearing face, a tool carrying slide mounted on said face, the box-like upright member of said frame having its upper part formed with a wide, flat horizontal bearing face, located between the side walls of the frame, an inverted tool-carrying slide operatively mounted against said last-mentioned face, for the purposes set forth.

In testimony whereof, I affix my signature.

FREDERICK S. FLOETER.